US007688974B2

(12) United States Patent
Lee et al.

(10) Patent No.: US 7,688,974 B2
(45) Date of Patent: Mar. 30, 2010

(54) RIJNDAEL BLOCK CIPHER APPARATUS AND ENCRYPTION/DECRYPTION METHOD THEREOF

(75) Inventors: Yun Kyung Lee, Kyungsangbook-Do (KR); Young Soo Park, Daejon (KR); Young Sae Kim, Daejon (KR); Sang Woo Lee, Daejon (KR); Sung Ik Jun, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 674 days.

(21) Appl. No.: 10/560,220

(22) PCT Filed: Jun. 1, 2004

(86) PCT No.: PCT/KR2004/001296

§ 371 (c)(1), (2), (4) Date: Dec. 9, 2005

(87) PCT Pub. No.: WO2004/112309

PCT Pub. Date: Dec. 23, 2004

(65) Prior Publication Data

US 2006/0147040 A1 Jul. 6, 2006

(30) Foreign Application Priority Data

Jun. 16, 2003 (KR) ...................... 10-2003-0038892
Sep. 18, 2003 (KR) ...................... 10-2003-0064737

(51) Int. Cl.
*H04K 1/04* (2006.01)
*H04K 1/06* (2006.01)

(52) U.S. Cl. .......................................... 380/37; 380/36

(58) Field of Classification Search .................. 380/36, 380/37, 255, 259, 260
See application file for complete search history.

(56) References Cited

U.S. PATENT DOCUMENTS

| | | | | |
|---|---|---|---|---|
| 6,230,257 | B1 * | 5/2001 | Roussel et al. | 712/221 |
| 6,246,768 | B1 * | 6/2001 | Kim | 380/28 |
| 7,158,638 | B2 * | 1/2007 | Okada et al. | 380/37 |
| 2002/0131588 | A1 * | 9/2002 | Yang | 380/37 |
| 2002/0191784 | A1 * | 12/2002 | Yup et al. | 380/37 |
| 2003/0059054 | A1 * | 3/2003 | Hu et al. | 380/277 |

* cited by examiner

*Primary Examiner*—Emmanuel L Moise
*Assistant Examiner*—Jing Sims
(74) *Attorney, Agent, or Firm*—Ladas & Parry LLP

(57) ABSTRACT

A rijndael block cipher apparatus including an operational unit that efficiently performs a round operation for encrypting/decrypting a rijndael block cipher and an encryption/decryption method thereof are disclosed. The rijndael block cipher apparatus is mounted in a mobile terminal such as a cellular phone and a PDA or a smart card, which requires a high-rate and small-sized cipher processor, and can encrypt and decrypt important data that requires security at high speed and perform the round operation with respect to upper 64 bits and lower 64 bits which are divided from 128-bit input data. Thus, the cipher apparatus can reduce the time required for encryption/decryption of the rijndael block cipher and the size of the apparatus.

12 Claims, 5 Drawing Sheets

RIJNDAEL BLOCK CIPHER APPARATUS AND ENCRYPTION/DECRYPTION METHOD THEREOF

TECHNICAL FIELD

The present invention relates generally to a rijndael block cipher apparatus and an encryption/decryption method thereof, and more particularly to a rijndael block cipher apparatus which is mounted in a cellular phone, PDA, smart card, and so on, and which can encrypt and decrypt important data that requires security at high speed, and an encryption/decryption method thereof.

BACKGROUND ART

Rijndael algorithm is a symmetric secret-key encryption algorithm that was developed by Joan Daemen and Vincent Rijmen who are Belgian encryption developers, and then selected as a new AES (Advanced Encryption Standard) by American NIST (National Institute Standards and Technology) in October, 2000 or thereabouts.

The rijndael algorithm supports a variable block length of an SPN (Substitution-Permutation Network) structure, and enables the use of 128-bit, 192-bit, and 256-bit keys with respect to respective block lengths.

The number of rounds in the rijndael algorithm is determined by key lengths, and in the case of using the 128-bit block, it is recommended to use 10, 12 and 14 rounds with respect to the 128-bit, 192-bit and 256-bit keys, respectively.

Recently, it is known that the rijndael algorithm causes no problem in security even if the 128-bit key is used, and thus researches for hardware implementation of the rijndael algorithm using the key having a length of 128 bits has already been under way.

Since the rijndael algorithm encrypts/decrypts data for the rijndael block encryption/decryption by repeating round operations, and is especially provided for supporting the variable block length of the SPN structure, the encryption process of a rijndael block cipher is different from the decryption process thereof. Typically, a round operation for the encryption process of the rijndael block cipher is composed of four transforms of substitution, shift_row, mixcolumn and add-round-key, and a round operation for the decryption process is composed o four transforms of inverse-shift_row, inverse substitution, add-round-key and inverse mixcolumn. According to methods of performing these transforms, times required for the round operation for the rijndael block cipher and hardware resources to be used differ, and further the method of performing the transform is vital to the performance of a rijndael cipher processor.

Accordingly, it is important to reduce the amount of hardware resource required for the implementation of the round operation and the time required for performing of the round operation.

DISCLOSURE OF THE INVENTION

Therefore, the applicant has developed a rijndael block cipher apparatus including an operational unit that efficiently performs a round operation for encrypting/decrypting the rijndael block cipher and an encryption/decryption method thereof.

It is an object of the present invention is to solve the problems involved in the prior art and to provide a rijndael block cipher apparatus which is mounted in a mobile terminal such as a cellar phone and a PDA or a smart card, which requires a high-rate and small-sized cipher processor, and which can encrypt and decrypt important data that requires security at high speed, and an encryption/decryption method thereof.

In order to accomplish the above-mentioned object, a rijndael block cipher apparatus according to an embodiment of the present invention comprises a round operation unit for transforming a 128-bit input key into a 128-bit round key for encryption or decryption, and storing the 128-bit round key according to a value of a mode signal from a time when a round operation start signal, a round number signal and a bit selection signal for dividing the 128-bit input data into upper 64 bits and lower 64 bits and selecting the upper or lower 64 bits are inputted after an encryption or decryption operation start signal and the mode signal are inputted, encrypting the 128-bit input data by dividing the 128-bit input data into the upper 64 bits and the lower 64 bits and by performing a round operation which is composed of transforms of shift_row, substitution, mixcolumn and add-round-key with respect to the divided upper 64 bits and lower b4 bits, respectively, and decrypting the 128-bit input data by dividing the 128-bit input data into the upper 64 bits and the lower 64 bits and by performing a round operation which is composed of transforms of inverse-shift_row, inverse substitution, add-round-key and inverse mixcolumn with respect to the divided upper 64 bits and lower b4 bits, respectively; a round operation control unit for controlling the round operation of the round operation unit by transmitting the round operation start signal, the round number signal and the bit selection signal for dividing the 128-bit input data into the upper 64 bits and lower 64 bits and selecting the upper or lower 64 bits to the round operation unit from a time when the encryption or decryption operation start signal and the mode signal are inputted; a 64-bit data register for storing intermediate encryption or decryption data of the upper 64-bit input data generated during each round operation performed by the round operation unit; and a 128-bit data register for storing intermediate encryption or decryption data of the lower 64-bit input data generated during each round operation performed by the round operation unit as its lower 64 bits, and storing the encryption or decryption data generated as a result of a last round operation and stored in the 64-bit data register as its upper 64-bit data.

In order to accomplish the above-mentioned object, a rijndael block encryption method according to a first embodiment of the present invention comprises the steps of if a four-clock round operation start signal and a round number signal are inputted from a round operation control unit after an encryption or decryption operation start signal and a mode signal are inputted through a bus, a round key generation unit of a round operation unit transforming a 128-bit input key into a 128-bit round key for encryption in accordance with a value of the mode signal inputted through the bus from a time when a first clock of the round operation start signal becomes '1', and storing the 128-bit round key in an internal 128-bit round key register; if the four-clock round operation start signal and a bit selection signal are inputted from the round operation control unit, a shift/inverse-shift_row transform unit performing a byte-shift of upper 64-bit data of 128-bit input data inputted through the bus and outputting the byte-shifted upper 64-bit data through a first multiplexer when the first clock becomes '1', and a substitution/inverse-substitution transform unit successively performing a substitution of the upper 64-bit data, outputting the substituted upper 64-bit data to a first demultiplexer, and storing the substituted upper 64-bit data in a 64-bit data register; when a second clock of the round operation start signal becomes '1', a mix/inverse-mixcolumn transform unit performing a mixcolumn of the upper 64-bit data outputted through an encryption output terminal of the first demultiplexer and stored in the 64-bit data register, outputting the mixcolumn-transformed upper 64-bit data to a second demultiplexer, and storing the mixcolumn-transformed upper 64-bit data in the 64-bit data register, the shift/inverse-shift_row transform unit simultaneously performing a byte-shift of lower 64-bit data of the 128-bit input data inputted through the bus and outputting the byte-shifted lower 64-bit data through the first multiplexer, and the substitution/inverse-substitution transform unit successively performing a substitution of the lower 64-bit data, outputting the substituted lower 64-bit data to the first demultiplexer, and storing the substituted lower 64-bit data in lower 64 bits of a 128-bit data register; when a third clock of the round operation start signal becomes '1' an add-round-key transform unit performing an addition of the upper 64-bit data outputted through an encryption output terminal of the second demultiplexer and stored in the 64-bit data register to upper 64-bit round key generated by the round key generation unit and storing the added upper 64-bit data in upper 64 bits of the 128-bit data register, and a mix/inverse-mixcolumn transform unit simultaneously performing a mixcolumn of the lower 64-bit data outputted through the encryption output terminal of the first demultiplexer and stored in the 128-bit data register, outputting the mixcolumn-transformed lower 64-bit data to the second demultiplexer, and storing the mixcolumn-transformed lower 64-bit data in the lower 64 bits of the 128-bit data register; and when a fourth clock of the round operation start signal becomes '1', the add-round-key transform unit performing an addition of the lower 64-bit data outputted through the encryption output terminal of the second demultiplexer and stored in the 128-bit data register to lower 64-bit round key generated by the round key generation unit and storing the added lower 64-bit data in the lower 64 bits of the 128-bit data register.

In order to accomplish the above-mentioned object, a rijndael block decryption method according to a first embodiment of the present invention comprises the steps of if a four-clock round operation start signal and a round number signal are inputted from a round operation control unit after an encryption or decryption operation start signal and a mode signal are inputted through a bus, a round key generation unit of a round operation unit transforming a 128-bit input key into a 128-bit round key for decryption in accordance with a value of the mode signal inputted through the bus from a time when a first clock of the round operation start signal becomes '1', and storing the 128-bit round key in an internal 128-bit round key register; if the four-clock round operation start signal and a bit selection signal are inputted from the round operation control unit, a shift/inverse-shift_row transform unit performing a byte-inverse-shift of upper 64-bit data of 128-bit input data inputted through the bus and outputting the byte-inverse-shifted upper 64-bit data through a first multiplexer when the first clock becomes, '1' and a substitution/inverse-substitution transform unit successively performing an inverse substitution of the upper 64-bit data, outputting the inverse-substituted upper 64-bit data to a first demultiplexer, and storing the inverse-substituted upper 64-bit data in a 64-bit data register; when a second clock of the round operation start signal becomes '1', an add-round-key transform unit performing an addition of the upper 64-bit data outputted through a decryption output terminal of the first demultiplexer and stored in the 64-bit data register to upper 64-bit round key generated by the round key generation unit, outputting the added upper 64-bit data to a third demultiplexer, and storing the added upper 64-bit data in the 64-bit data register, the shift/inverse-shift_row transform unit simultaneously performing a byte-inverse-shift of lower 64-bit data of the 128-bit input data inputted through the bus, and outputting the byte-inverse-shifted lower 64-bit data through the first multiplexer, and the substitution/inverse-substitution transform unit successively performing an inverse substitution of the lower 64-bit data, outputting the inverse-substituted lower 64-bit data to the first demultiplexer, and storing the inverse-substituted lower 64-bit data in lower 64 bits of a 128-bit data register; when a third clock of the round operation start signal becomes '1', a mix/inverse-mixcolumn transform unit performing an inverse mixcolumn of the upper 64-bit data outputted through a decryption output terminal of the third demultiplexer and stored in the 64-bit data register, outputting the inverse-mixcolumn-transformed upper 64-bit data through a second demultiplexer, and storing the inverse-mixcolumn-transformed upper 64-bit data in upper 64 bits of the 128-bit data register, and the add-round-key transform unit simultaneously performing an addition of the lower 64-bit data outputted through the decryption output terminal of the first demultiplexer and stored in the 128-bit data register to lower 64-bit round key generated by the round key generation unit, outputting the added lower 64-bit data through the third demultiplexer, and storing the added lower 64-bit data in the lower 64 bits of the 128-bit data register; and when a fourth clock of the round operation start signal becomes '1', the mix/inverse-mixcolumn transform unit performing an inverse mixcolumn of the lower 64-bit data outputted through the decryption output terminal of the third demultiplexer and stored in the 128-bit data register, outputting the inverse-mixcolumn-transformed lower 64-bit data through a second demultiplexer, and storing the inverse-mixcolumn-transformed lower 64-bit data in the lower 64 bits of the 128-bit data register.

In order to accomplish the above-mentioned object, a rijndael block encryption method according to a second embodiment of the present invention comprises the steps of if a three-clock round operation start signal and a round number signal are inputted from a round operation control unit after an encryption or decryption operation start signal and a mode signal are inputted through a bus, a round key generation unit of a round operation unit transforming a 128-bit input key into a 128-bit round key for encryption in accordance with a value of the mode signal inputted through the bus from a time when a first clock of the round operation start signal becomes '1', and storing the 128-bit round key in an internal 128-bit round key register; if the three-clock round operation start signal and a bit selection signal are inputted from the round operation control unit, a shift/inverse-shift_row transform unit performing a byte-shift of upper 64-bit data of 128-bit input data inputted through the bus and outputting the byte-shifted upper 64-bit data through a first multiplexer when the first clock becomes '1', and a substitution/inverse-substitution transform unit successively performing a substitution of the upper 64-bit data, outputting the substituted upper 64-bit data to a first demultiplexer, and storing the substituted upper 64-bit data in a 64-bit data register; when a second clock of the round operation start signal becomes '1', a mix/inverse-mixcolumn transform unit performing a mixcolumn of the upper 64-bit data outputted through an encryption output terminal of the first demultiplexer and stored in the 64-bit data register, and outputting the mixcolumn-transformed upper 64-bit data to a second demultiplexer, an add-round-key transform unit successively performing an addition of this upper 64-bit data to an upper 64-bit round key generated by the round key generation unit, and storing the added upper 64-bit data in the 64-bit data register, the shift/inverse-shift_row transform unit simultaneously performing a byte-shift of lower 64-bit data of the 128-bit input data inputted through the bus, and outputting the byte-shifted lower 64-bit data through the first multiplexer, and the substitution/inverse-substitution transform unit successively performing a substitution of the lower 64-bit data, outputting the substituted lower 64-bit data to the first demultiplexer, and storing the substituted lower 64-bit data in lower 64 bits of a 128-bit data register; and when a third clock of the round operation start signal becomes '1', storing the 64-bit data added and then stored in the 64-bit data register in upper 64 bits of the 128-bit data register, the mix/inverse-mixcolumn transform unit simultaneously performing a mixcolumn of the lower 64-bit data outputted through the encryption output terminal of the first demultiplexer and stored in the 128-bit data register, and outputting the mixcolumn-transformed lower 64-bit data to the second demultiplexer, and the add-round-key transform unit successively performing an addition of the lower 64-bit data to lower 64-bit round key generated by the round key generation unit, and storing the added lower 64-bit data in the lower 64 bits of the 128-bit data register.

In order to accomplish the above-mentioned object, a rijndael block decryption method according to a second embodiment of the present invention comprises the steps of if a three-clock round operation start signal and a round number signal are inputted from a round operation control unit after an encryption or decryption operation start signal and a mode signal are inputted through a bus, a round key generation unit of a round operation unit transforming a 128-bit input key into a 128-bit round key for decryption in accordance with a value of the mode signal inputted through the bus from a time when a first clock of the round operation start signal becomes '1', and storing the 128-bit round key in an internal 128-bit round key register; if the three-clock round operation start signal and a bit selection signal are inputted from the round operation control unit, a shift/inverse-shift_row transform unit performing a byte-inverse-shift of upper 64-bit data of 128-bit input data inputted through the bus, and outputting the byte-inverse-shifted upper 64-bit data through a first multiplexer when the first clock becomes '1', and a substitution/inverse-substitution transform unit successively performing an inverse substitution of the upper 64-bit data, outputting the inverse-substituted upper 64-bit data to a first demultiplexer, and storing the inverse-substituted upper 64-bit data in a 64-bit data register; when a second clock of the round operation start signal becomes '1', an add-round-key transform unit performing an addition of the upper 64-bit data outputted through a decryption output terminal of the first demultiplexer and stored in the 64-bit data register to upper 64-bit round key generated by the round key generation unit, and outputting the added upper 64-bit data to a third demultiplexer, a mix/inverse-mixcolumn transform unit successively performing an inverse mixcolumn of the added upper 64-bit data, outputting the inverse-mixcolumn-transformed upper 64-bit data through a second demultiplexer, and storing the inverse-mixcolumn-transformed upper 64-bit data in the 64-bit data register, the shift/inverse-shift_row transform unit simultaneously performing a byte-inverse-shift of lower 64-bit data of the 128-bit input data inputted through the bus, and outputting the byte-inverse-shifted lower 64-bit data through the first multiplexer, and the substitution/inverse-substitution transform unit successively performing an inverse substitution of the lower 64-bit data, outputting the inverse-substituted lower 64-bit data to the first demultiplexer, and storing the inverse-substituted lower 64-bit data in lower 64 bits of a 128-bit data register; and when a third clock of the round operation start signal becomes '1', the add-round-key transform unit performing an addition of the lower 64-bit data outputted through the decryption output terminal of the first demultiplexer and stored in the 128-bit data register to lower 64-bit round key generated by the round key generation unit and outputting the added lower 64-bit data to the third demultiplexer, the mix/inverse-mixcolumn transform unit successively performing an inverse mixcolumn of the added lower 64-bit data, outputting the inverse-mixcolumn-transformed lower 64-bit data through a second demultiplexer, and storing the inverse-mixcolumn-transformed lower 64-bit data in the lower 64 bits of the 128-bit data register, and simultaneously storing the upper 64-bit data stored in the 64-bit data register in upper 64 bits of the 128-bit data register.

In order to accomplish the above-mentioned object, a rijndael block encryption method according to a third embodiment of the present invention comprises the steps of if a two-clock round operation start signal and a round number signal are inputted from a round operation control unit after an encryption or decryption operation start signal and a mode signal are inputted through a bus, a round key generation unit of a round operation unit transforming a 128-bit input key into a 128-bit round key for encryption in accordance with a value of the mode signal inputted through the bus from a time when a first clock of the round operation start signal becomes '1', and storing the 128-bit round key in an internal 128-bit round key register; if the two-clock round operation start signal and a bit selection signal are inputted from the round operation control unit, a shift/inverse-shift_row transform unit performing a byte-shift of upper 64-bit data of 128-bit input data inputted through the bus and outputting the byte-shifted upper 64-bit data through a first multiplexer when the first clock becomes '1', a substitution/inverse-substitution transform unit successively performing a substitution of the upper 64-bit data, and outputting the substituted upper 64-bit data through a first demultiplexer, a mix/inverse-mixcolumn transform unit performing a mixcolumn of the upper 64-bit data outputted through an encryption output terminal of the first demultiplexer, and outputting the mixcolumn-transformed upper 64-bit data to a second demultiplexer, and an add-round-key transform unit successively performing an addition of this upper 64-bit data to an upper 64-bit round key generated by the round key generation unit, and storing the added upper 64-bit data in a 64-bit data register; and when a second clock of the round operation start signal becomes '1', the shift/inverse-shift_row transform unit performing a byte-shift of lower 64-bit data of the 128-bit input data inputted through the bus and outputting the byte-shifted lower 64-bit data through the first multiplexer, and the substitution/inverse-substitution transform unit successively performing a substitution of the lower 64-bit data, and outputting the substituted lower 64-bit data to the first demultiplexer, the mix/inverse-mixcolumn transform unit successively performing a mixcolumn of the lower 64-bit data, and outputting the mixcolumn-transformed lower 64-bit data to the second demultiplexer, the add-round-key transform unit successively performing an addition of this lower 64-bit data to lower 64-bit round key generated by the round key generation unit, and storing the added lower 64-bit data in lower 64 bits of a 128-bit data register, and simultaneously storing the upper 64-bit data stored in the 64-bit data register in upper 64 bits of the 128-bit data register.

In order to accomplish the above-mentioned object, a rijndael block decryption method according to a third embodiment of the present invention comprises the steps of if a two-clock round operation start signal and a round number signal are inputted from a round operation control unit after an encryption or decryption operation start signal and a mode signal are inputted through a bus, a round key generation unit of a round operation unit transforming a 128-bit input key into a 128-bit round key for decryption in accordance with a value of the mode signal inputted through the bus from a time when a first clock of the round operation start signal becomes ‘1’, and storing the 128-bit round key in an internal 128-bit round key register; if the two-clock round operation start signal and a bit selection signal are inputted from the round operation control unit, a shift/inverse-shift_row transform unit performing a byte-inverse-shift of upper 64-bit data of 128-bit input data inputted through the bus, and outputting the byte-inverse-shifted upper 64-bit data through a first multiplexer when the first clock becomes ‘1’, a substitution/inverse-substitution transform unit successively performing an inverse substitution of the upper 64-bit data, and outputting the inverse-substituted upper 64-bit data to a first demultiplexer, an add-round-key transform unit successively performing an addition of the upper 64-bit data outputted through a decryption output terminal of the first demultiplexer to an upper 64-bit round key generated by the round key generation unit, and outputting the added upper 64-bit data to a third demultiplexer, and a mix/inverse-mixcolumn transform unit successively performing an inverse mixcolumn of the added upper 64-bit data, outputting the inverse-mixcolumn-transformed upper 64-bit data through a second demultiplexer, and storing the inverse-mixcolumn-transformed upper 64-bit data in a 64-bit data register; and when a second clock of the round operation start signal becomes ‘1’, the shift/inverse-shift_row transform unit performing a byte-inverse-shift of lower 64-bit data of the 128-bit input data inputted through the bus and outputting the byte-inverse-shifted lower 64-bit data through the first multiplexer, the substitution/inverse-substitution transform unit successively performing an inverse substitution of the lower 64-bit data, and outputting the inverse-substituted lower 64-bit data to the first demultiplexer, the add-round-key transform unit successively performing an addition of the lower 64-bit data outputted through the decryption output terminal of the first demultiplexer to a lower 64-bit round key generated by the round key generation unit, and outputting the added lower 64-bit data to the third demultiplexer, the mix/inverse-mixcolumn transform unit successively performing an inverse mixcolumn of the added lower 64-bit data, outputting the inverse-mixcolumn-transformed lower 64-bit data through a second demultiplexer, and storing the inverse-mixcolumn-transformed lower 64-bit data in lower 64 bits of a 128-bit data register, and simultaneously storing the upper 64-bit data stored in the 64-bit data register in upper 64 bits of the 128-bit data register.

BRIEF DESCRIPTION OF THE DRAWINGS

The above object, other features and advantages of the present invention will become more apparent by describing the preferred embodiments thereof with reference to the accompanying drawings, in which.

BEST MODE FOR CARRYING OUT THE INVENTION

Now, a rijndael block cipher apparatus and an encryption/decryption method thereof according to preferred embodiments of the present invention will be described in detail with reference to the annexed drawings.

Figure 1:
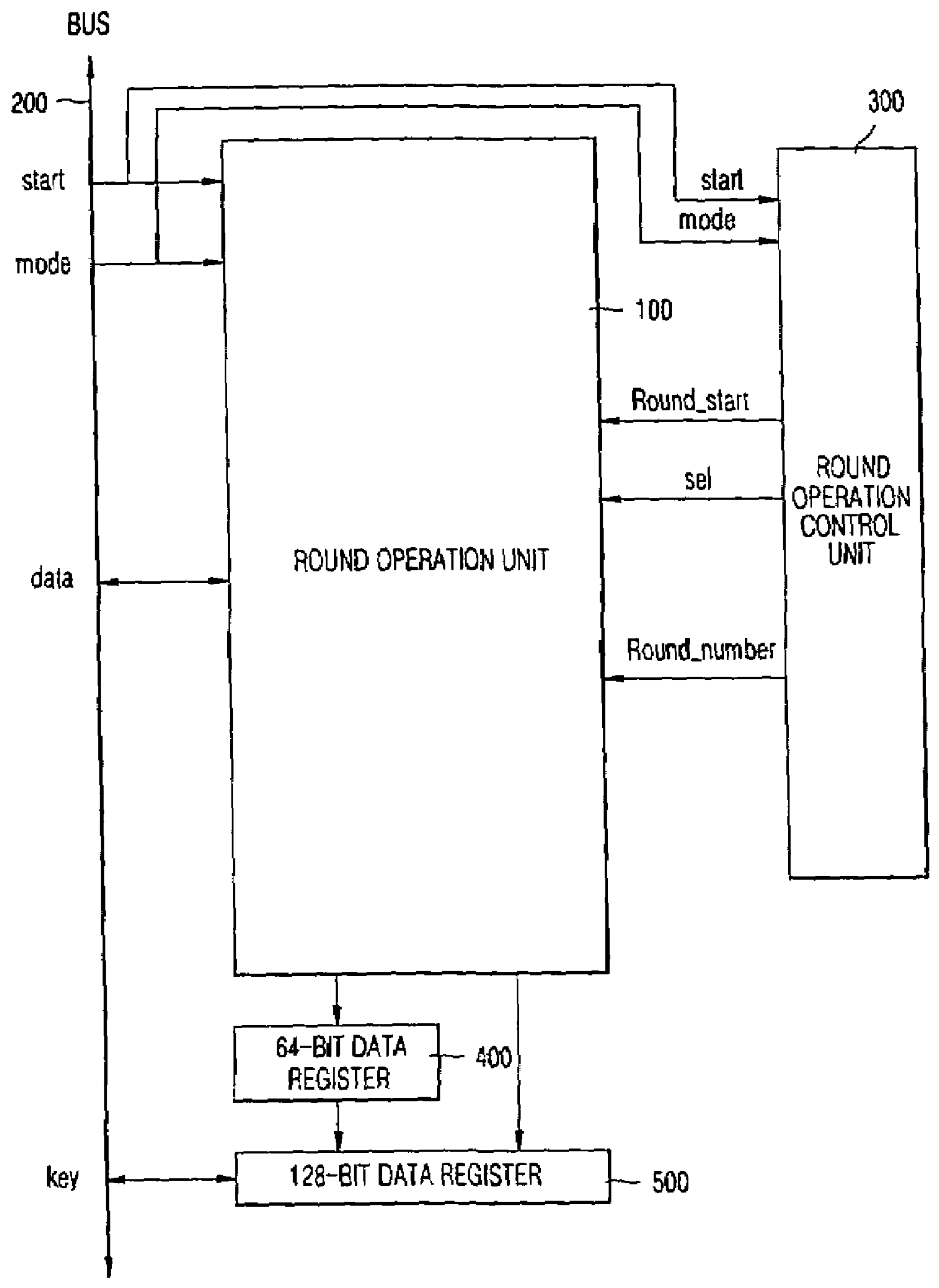
FIG. 1 is a view illustrating the construction of a rijndael block cipher apparatus according to the present invention.

Referring to FIG. 1, the rijndael block cipher apparatus according to the present invention is primary intended to perform all round operations for encrypting and decrypting input data for rijndael block encryption/decryption in the unit of 64 bits, and to generate round keys required for the round operations simultaneously with performing the round operations.

A round operation unit 100 transforms a 128-bit input key into a 128-bit round key RK for encryption or decryption and stores the 128-bit round key according to a value of a mode signal from a time when a round operation start signal Round_ start, a round number signal Round_number and a bit selection signal sel for dividing the 128-bit input data into upper 64 bits and lower 64 bits and selecting the upper or lower 64 bits for each round operation are inputted after an encryption or decryption operation start signal start and the mode signal are inputted through a bus 200 for rijndael block encryption/decryption.

If the value of the mode signal indicates ‘0’, the round operation unit 100 encrypts the 128-bit input data by dividing the 128-bit input data into the upper 64 bits and the lower 64 bits and performing a round operation which is composed of transforms of shift_row, substitution, mixcolumn and add-round-key with respect to the divided upper 64 bits and lower b4 bits, respectively.

If the value of the mode signal indicates ‘1’, the round operation unit 100 decrypts the 128-bit input data by dividing the 128-bit input data into the upper 64 bits and the lower 64 bits and performing a round operation which is composed of transforms of inverse shift_row, inverse substitution, add-round-key and inverse mixcolumn with respect to the divided upper 64 bits and lower b4 bits, respectively.

A round operation control unit 300, if the encryption or decryption operation start signal and the mode signal are inputted through the bus 200, controls the round operation of the round operation unit 100 by transmitting the round operation start signal Round_start, the round number signal Round_ number and the bit selection signal for dividing the 128-bit input data into the upper 64 bits and the lower 64 bits and selecting the divided upper or lower 64 bits for each round operation to the round operation unit 100 from the time when the encryption or decryption operation start signal and the mode signal are inputted.

A 64-bit data register 400 stores intermediate encryption or decryption data of the upper 64-bit input data generated during each round operation performed by the round operation unit 100.

A 128-bit data register 500 stores intermediate encryption or decryption data of the lower 64-bit input data generated during each round operation performed by the round operation unit 100 as its lower 64 bits, and stores the encryption or decryption data generated as a result of a last round operation and stored in the 64-bit data register 400 as its upper 64 bits.

Figure 2:
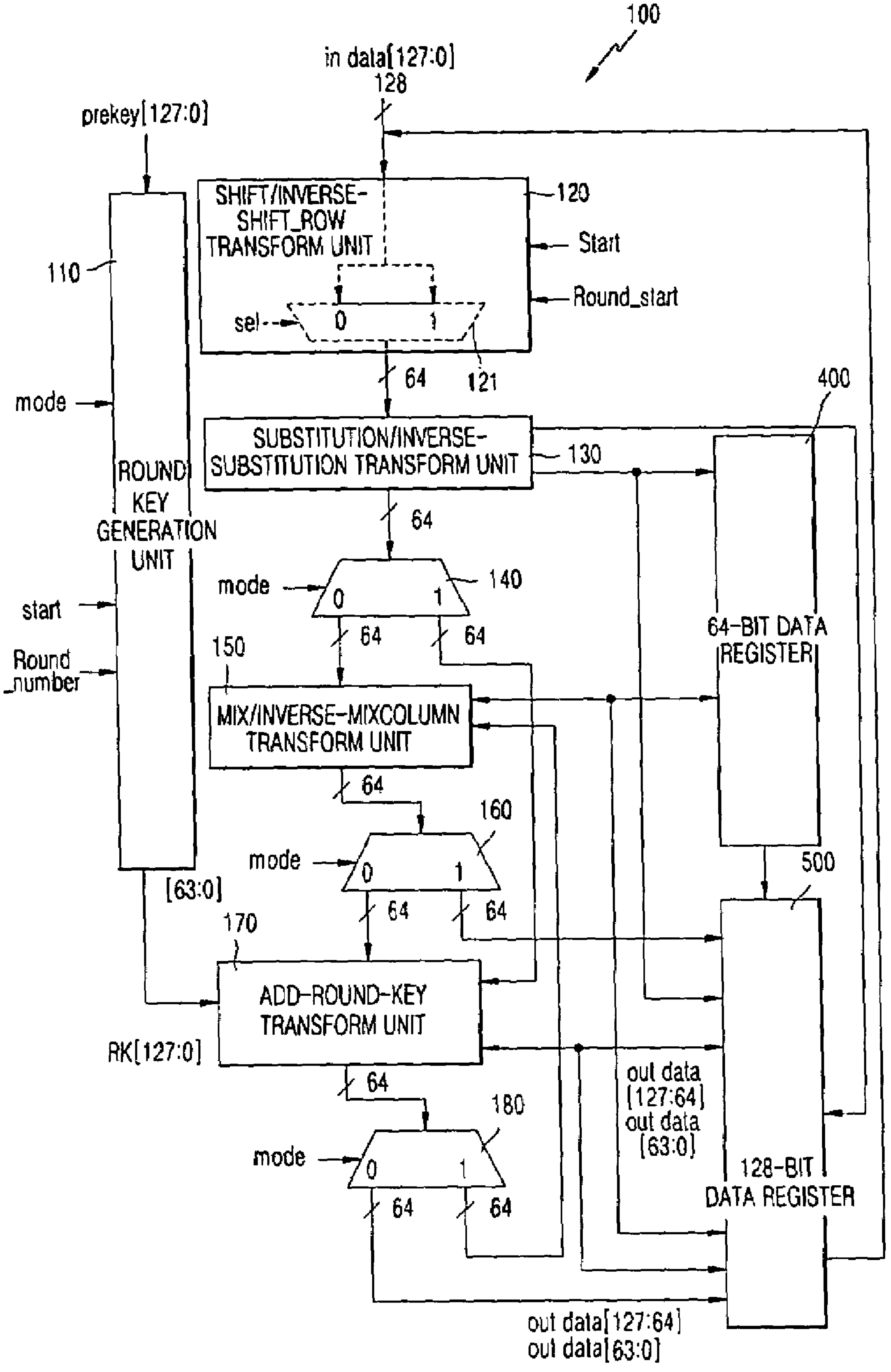
FIG. 2 is a view illustrating the construction of a round operation unit.

Referring to FIG. 2, a round key generation unit 110 of the round operation unit 100 transforms the 128-bit input key into the 128-bit round key RK according to the value of the mode signal inputted through the bus 200 and stores the 128-bit round key in an internal 128-bit round key register if the round operation start signal and the round number signal are inputted from the round operation control unit 300.

A shift/inverse-shift_row transform unit 120 of the round operation unit 100, if the round operation start signal and a bit selection signal are inputted from the round operation control unit 300, performs a byte-shift of the upper 64 bits and the lower 64 bits divided from the 128-bit input data inputted through the bus 200 by different numbers according to the value of the mode signal inputted through the bus 200, and outputs the byte-shifted upper 64 bits and lower 64 bits through a first multiplexer 121 the output of which is controlled according to the value of the bit selection signal A substitution/inverse-substitution transform unit 130 of the round operation unit 100 performs a substitution or an inverse substitution of the upper 64-bit data and the lower 64-bit data outputted from the shift/inverse-shift_row transform unit 120 using a substitution box (S-box) or an inverse-substitution box (SI-box) that provides a one-byte output with respect to a one-byte input.

A first demultiplexer 140 of the round operation unit 100 outputs the upper 64-bit data or the lower 64-bit data outputted from the substitution/inverse-substitution transform unit 130 through either of its encryption output terminal '0' and its decryption output terminal '1' according to the value of the mode signal A mix/inverse-mixcolumn transform unit 150 of the round operation unit 100 performs a mixcolumn of the upper 64-bit data or the lower 64-bit data inputted through the encryption output terminal '0' of the first demultiplexer 140, or performs an inverse mixcolumn of the upper 64-bit data or the lower 64-bit data that has been add-round-key-transformed.

A second demultiplexer 160 of the round operation unit 100 outputs the upper 64-bit data or the lower 64-bit data outputted from the mix/inverse-mixcolumn transform unit 150 through either of its encryption output terminal '0' and its decryption output terminal '1' according to the value of the mode signal An add-round-key transform unit 170 of the round operation unit 100 performs an addition of the upper 64-bit data or the lower 64-bit data inputted through the decryption output terminal '1' of the first demultiplexer 140 or the encryption output terminal '0' of the second demultiplexer 160 to the 128-bit round key RK for encryption or decryption outputted from the round key generation unit 110.

Figure 3:
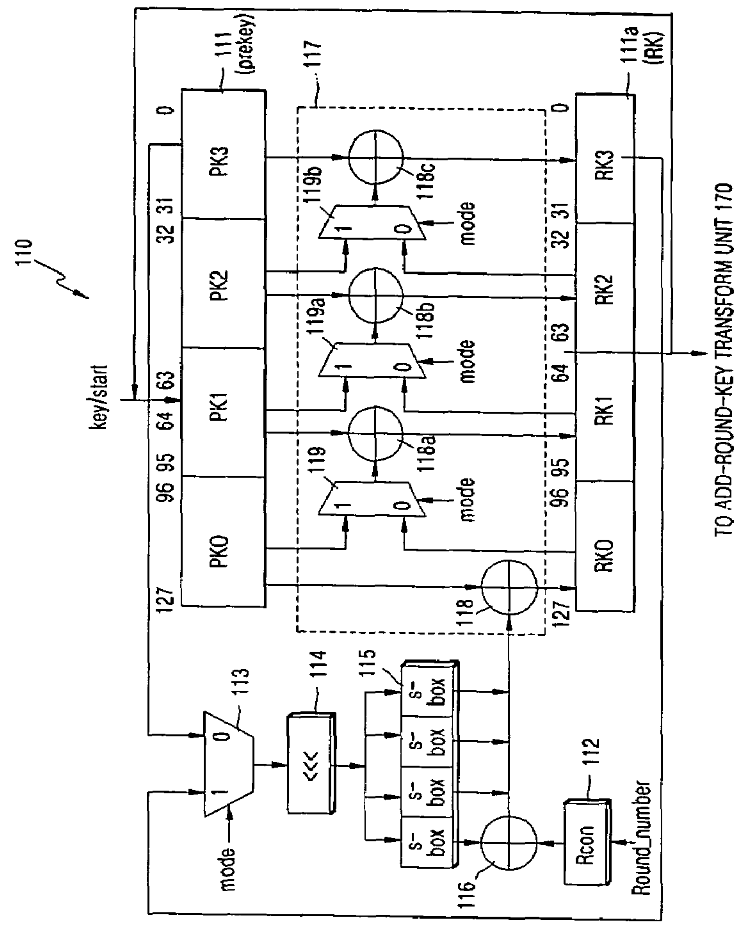
FIG. 3 is a view illustrating the construction of a round key generation unit.

A third demultiplexer 180 of the round operation unit 100 outputs the upper 64-bit data or the lower 64-bit data outputted from the add-round-key transform unit 170 through either of its encryption output terminal '0' and its decryption output terminal '1' according to the value of the mode signal Referring to FIG. 3, a 128-bit prekey register 111 of the round key generation unit 110 stores the 128-bit input key inputted through the bus 200 as a prekey for transforming the 128-bit input key into the 128-bit round key RK for encryption or decryption, and stores the 128-bit round key RK generated after each round operation as a prekey for generating the round key used in the next round operation.

A 128-bit round key register 111*a* of the round key generation unit 110 stores the 128-bit round key RK for encryption or decryption for each round operation. In FIG. 3, the 128-bit round key RK to be stored in the 128-bit round key register 111*a* is backed up to the 128-bit prekey register 111 after each round operation, and is used as a round key (i.e., prekey) of the previous round in the next round operation.

A constant storage unit 112 of the round key generation unit 110 stores constant values Rcon determined according to the order of the round indicated by the round number signal inputted from the round operation control unit 300. It is preferable that the constant storage unit 112 comprises a ROM.

A second multiplexer 113 of the round key generation unit 110 is controlled according to the value of the mode signal inputted through the bus 200, and selects and outputs either of 32-bit keys for encryption or decryption inputted from the 128-bit prekey register 111 and the 128-bit round key register 111*a*.

A shifter 114 of the round key generation unit 110 performs a cyclic shift of the 32-bit key inputted through the second multiplexer 113 to the left by one byte.

A substitution transform unit 115 of the round key generation unit 110 is composed of substitution boxes (S-boxes) for performing the substitution operation, and performs a substitution of the 32-bit key shifted by the shifter 114.

A first XOR gate 116 of the round key generation unit 110 performs an XOR operation of the most significant byte of the 32-bit key outputted from the substitution transform unit 115 with the constant value stored in the constant storage unit 112.

A round XOR operation unit 117 of the round key generation unit 110 newly generates the 128-bit round key RK for encryption or decryption to be stored in the 128-bit round key register 111*a* for each round of the round operation by performing an XOR operation using a 32-bit value obtained by adding output bits of the first XOR gate 116 to the remaining 24 bits except for the most significant byte of the substitution transform unit 115, the 128-bit round key (i.e., prekey) of the previous round stored in the 128-bit prekey register 111, and the 128-bit round key RK of the new round stored in the 128-bit round key register 111*a*.

A second XOR gate 118 of the round XOR operation unit 117 generates the most significant 32-bit round key RKO of the 128-bit round key for encryption or decryption of the new round by performing an XOR operation of the 32-bit value obtained by adding the output bits of the first XOR gate 116 to the remaining 24 bits except for the most significant byte of the substitution transform unit 115, with the most significant 32-bit round key PKO of the 128-bit round key of the previous round.

A third XOR gate 118*a* of the round XOR operation unit 117 generates a 32-bit (i.e., $95^{th}$ bit to $64^{th}$ bit) round key RK1 of the 128-bit round key for encryption of the new round by performing an XOR operation of the most significant 32-bit (i.e., $127^{th}$ bit to $96^{th}$ bit) round key RKO of the 128-bit round key of the new round with a 32-bit (i.e., $95^{th}$ bit to $64^{th}$ bit) round key PK1 next to the most significant 32 bits of the 128-bit round key of the previous round.

The third XOR gate 118*a* also generates a 32-bit (i.e., $95^{th}$ bit to $64^{th}$ bit) round key RK1 of the 128-bit round key for decryption of the new round by performing an XOR operation of the most significant 32-bit (i.e., $127^{th}$ bit to $96^{th}$ bit) round key PKO of the 128-bit round key of the previous round with a 32-bit (i.e., $95^{th}$ bit to $64^{th}$ bit) round key PK1 next to the most significant 32 bits.

A third multiplexer 119 of the round XOR operation unit 117 is controlled according to the value of the mode signal inputted through the bus 200, and selectively determines input signals of the third XOR gate 118*a*.

A fourth XOR gate 118*b* of the round XOR operation unit 117 generates a 32-bit (i.e., $63^{rd}$ bit to $32^{nd}$ bit) round key RK2 of the 128-bit round key for encryption of the new round by performing an XOR operation of a 32-bit (i.e., $95^{th}$ bit to $64^{th}$ bit) round key RK1 of the 128-bit round key of the new round with a 32-bit (i.e., $63^{rd}$ bit to $32^{nd}$ bit) round key PK2 of the 128-bit round key of the previous round.

The fourth XOR gate 118*b* also generates a 32-bit (i.e., $63^{rd}$ bit to $32^{nd}$ bit) round key RK2 of the 128-bit round key for decryption of the new round by performing an XOR operation of a 32-bit (i.e., $95^{th}$ bit to $64^{th}$ bit) round key PK1 of the 128-bit round key of the previous round with a next 32-bit (i.e., $63^{rd}$ bit to $32^{nd}$ bit) round key PK2.

A fourth multiplexer 119*a* of the round XOR operation unit 117 is controlled according to the value of the mode signal inputted through the bus 200, and selectively determines input signals of the fourth XOR gate 118*b*.

A fifth XOR gate 118*c* of the round XOR operation unit 117 generates a 32-bit (i.e., $31^{st}$ bit to $0^{th}$ bit) round key RK3 of the 128-bit round key for encryption of the new round by performing an XOR operation of a 32-bit (i.e., $63^{rd}$ bit to $32^{nd}$ bit) round key RK2 of the 128-bit round key of the new round with a 32-bit (i.e., $31^{st}$ bit to $0^{th}$ bit) round key PK3 of the 128-bit round key of the previous round.

A fifth XOR gate 118*c* also generates a 32-bit (i.e., $31^{st}$ bit to $0^{th}$ bit) round key RK3 of the 128-bit round key for decryption of the new round by performing an XOR operation of a 32-bit (i.e., $63^{rd}$ bit to $32^{nd}$ bit) round key PK2 of the 128-bit round key of the previous round with a next 32-bit (i.e., $31^{st}$ bit to $0^{th}$ bit) round key PK3.

A fifth multiplexer 119*b* of the round XOR operation unit 117 is controlled according to the value of the mode signal inputted through the bus 200, and selectively determines input signals of the fifth XOR gate 118*c*.

The rijndael block cipher apparatus as constructed above according to the present invention performs the encryption and decryption processes as follows:

First, referring to FIGS. 1 and 2, the encryption and decryption operation of the rijndael block cipher apparatus will be explained.

If a round operation starts, a round key generation process is performed as the initial 128-bit input key is inputted to the round key generation unit 100 through the bus 200, and 128-bit input data is inputted to the shift/inverse-shift_row transform unit 120.

At this time, the shift/inverse-shift_row transform unit 120 performs a shift/inverse-shift by different numbers of bytes as defined in the rijndael block cipher algorithm.

If the round operation control unit 300 sends a signal that selects upper 64 bits (sel='1'), the shift/inverse-shift_row transform unit 120 outputs the upper 64 bits through the first multiplexer 121, while if the round operation control unit 300 sends a signal that selects lower 64 bits (sel='0'), it outputs the lower 64 bits through the first multiplexer 121.

After the byte shift/inverse-shift_row operation as described above is performed, the upper or lower 64-bit data is inputted to the substitution/inverse-substitution transform unit 130, and the substitution or inverse substitution of the data is performed by a substitution box (S-box) or an inverse-substitution box (SI-box). At this time, the S-box and the SI-box serve as a substitution transform unit that outputs a one-byte output with respect to a one-byte input as defined in a specification of the rijndael algorithm. Also, since it is enough that the substitution/inverse-substitution transform unit 130 proposed according to the present invention processes only 64-bit data at a time, it requires only 8 S-boxes or 8 SI-boxes.

If a mode signal that selects the encryption process (mode='0') is inputted through the bus 200 after the substitution/inverse-substitution operation is performed as described above, the upper or lower 64-bit data is inputted to the mix/inverse-mixcolumn transform unit 150 through the encryption output terminal '0' of the first demultiplexer 140, while if a mode signal that selects the decryption process (mode='1') is inputted through the bus 200, the upper or lower 64-bit data is inputted to the add-round-key transform unit 170 through the c mix/inverse-mixcolumn transform unit 150 through the decryption output terminal '1' of the first demultiplexer 140.

If the mode signal that selects the encryption process (mode='0') is inputted through the bus 200, the 64-bit data that has passed through the mix/inverse-mixcolumn transform unit is inputted to the add-round-key transform unit 170 through the encryption output terminal '0' of the second demultiplexer 160, while if the mode signal that selects the decryption process (mode='1') is inputted through the bus 200, the 64-bit data is outputted through the decryption output terminal '1' of the second demultiplexer 160 as a resultant data of the round operation.

Also, if the mode signal that selects the encryption process (mode='0') is inputted through the bus 200, the 64-bit data that has passed through the add-round-key transform unit is outputted through the encryption output terminal '0' of the third demultiplexer 180 as a resultant output of the round operation, while if the mode signal that selects the decryption process (mode='1') is inputted through the bus 200, the 64-bit data is inputted to the mix/inverse-mixcolumn transform unit 150 through the decryption output terminal '1' of the third demultiplexer 180.

As described above, since the present invention is intended to reduce the use of hardware resources by sharing constituent elements commonly used in the encryption process and the decryption process, the respective transform units have both functions of encryption and decryption.

Meanwhile, referring to FIG. 3, the generation of round keys for encryption or decryption required for the encryption and decryption operation of the rijndael block cipher apparatus according to the present invention and performed by the round key generation unit 110 will be explained.

If the 4-clock or 3-clock round operation start signal and the round number signal are inputted from the round operation control unit 300 to the round operation unit 100, the round operation starts.

If the round operation starts, the round key generation unit 110 starts to generate a round key RK of a new round using the 128-bit round key (i.e., prekey) of the previous round stored in the 128-bit prekey register 111.

If the mode signal that selects the encryption (mode='0') is inputted through the bus 200, the least significant 32 bits (PK3) of the 128-bit round key of the previous round of the 128-bit prekey register 111 is inputted to the shifter 114 through the second multiplexer 113.

By contrast, if the mode signal that selects the decryption (mode='1') is inputted through the bus 200, the fifth XOR gate 118*c* performs an XOR operation of the lower 64 bits PK2 and PK3 of the round key of the previous round, and temporarily stores the XORed 32 bits as the least significant 32 bits RK3 of a new round key. Simultaneously, this value RK3 is inputted to the shifter 114 through the second multiplexer 113.

The 32-bit key inputted to the shifter 114 is shifted to the left by one byte, and then substituted by the substitution transform unit 115 composed of 4 S-boxes.

As described above, the most significant 8-bit key of the substitution-transformed 32-bit keys is XORed by the first XOR gate 116 with the constant value Rcon determined according to the order of the round indicated by the round number signal inputted from the round operation control unit 300. The resultant 8 bits outputted from the first XOR gate 116 are added to the remaining 24 bits outputted from the substitution transform unit 115, and the added bits are inputted to the second XOR gate 118 of the round XOR operation unit 117.

Especially, by limiting the part in which the constant values related to the round numbers are XORed during the round key generation process only to the upper 8 bits of the 32-bit data that has passed through the substitution transform unit 115, the effect of reduction of the hardware size can be obtained. For this, the rijndael algorithm specification describes the structure that makes 32-bit constant value that is related to the round number by padding '0' of 24 bits to the 8-bit constant value, and then performs an XOR operation of the 32-bit constant value with the 32-bit value that has passed through the substitution transform unit 115.

Then, the second XOR gate 118 performs an XOR operation of the 32 bits, which are obtained by adding the resultant 8 bits outputted from the first XOR gate 116 to the remaining 24 bits outputted from the substitution transform unit 115, with the most significant 32 bits PK0 of the round key of the previous round, and stores the resultant value of the XOR operation as the most significant 32-bit round key RK0 of the new round.

After the most significant 32-bit round key RK0 required for encryption or decryption of the new round is generated as described above, the third XOR gate 118*a*, in the case of encryption process, generates the next 32-bit round key RK1 of the new round by performing an XOR operation of the most significant 32-bit round key RKO of the new round with the upper 32-bit (i.e., $95^{th}$ bit to $64^{th}$ bit) round key PK1 of the previous round. In the case of decryption process, the third XOR gate 118*a* generates the next 32-bit round key RK1 of the new round by performing an XOR operation of the most significant 32-bit round key PKO of the previous round with the next upper 32-bit round key PK1 of the previous round.

At this time, the third multiplexer 119 determines the input values of the third XOR gate 118*a* according to the mode signal that is inputted through the bus 200 and that indicates the encryption process or the decryption process.

After the 32-bit round key RK1 next to the most significant 32-bit round key RK0 of the new round is generated as described above, the next 32-bit round key RK2 and the least significant 32-bit round key RK3 for encryption or decryption are generated by the fourth XOR gate 118*b* and the fifth XOR gate 118*c* which operate in the same manner as the third XOR gate 118*a*. The fourth multiplexer 119*a* determines the input varies of the fourth XOR gate 118*b*, and the fifth multiplexer 119*b* determines the input values of the fifth XOR gate 118*c*.

Especially, the time required to generate the 128-bit round key of the new round in the unit of 32 bits corresponds to the whole 4-clock period of the round operation start signal inputted from the round operation control unit 300 in the case of encryption process, and corresponds to the whole 2-clock period in the case of decryption process.

In practice, when the first clock of the encryption round operation start signal becomes '1', the most significant 32-bit round key RK0 of the new round is generated through the second XOR gate 118, and whenever the second, third and fourth clocks become '1', the 32-bit round keys RK1, RK2 and RK3 of the new round are generated through the third XOR gate 118*a*, fourth XOR gate 118*b* and fifth XOR gate 118*c*, respectively. Also, when the first clock of the decryption round operation start signal becomes '1', the most significant 32-bit round key RK0 of the new round is generated through the second XOR gate 118, and when the second clock becomes '1', the 32-bit round keys RK1, RK2 and RK3 of the new round are simultaneously generated through the third XOR gate 118*a*, fourth XOR gate 118*b* and fifth XOR gate 118*c*.

In the case that the 3-clock round operation start signal is inputted from the round operation control unit 300 to the round operation unit 100, the round key generation unit 110 generates the encryption round key during the 2-clock period.

At this time, the process of generating the most significant 32-bit (i.e., $127^{th}$ bit to $96^{th}$ bit) round key RK0 of the 128-bit round key of the new round is performed when the first clock of the round operation start signal becomes '1'.

If the second clock of the round operation start signal becomes '1', the third XOR gate 118*a* generates the 32-bit (i.e., $95^{th}$ bit to $64^{th}$ bit) round key RK1 of the 128-bit round key for encryption of the new round by performing an XOR operation of the most significant 32-bit (i.e., $127^{th}$ bit to $96^{th}$ bit) round key RKO of the 128-bit round key of the new round with the 32-bit round key PK1 next to the most significant 32 bits of the 128-bit round key of the previous round.

Simultaneously, the fourth XOR gate 118*b* generates a 32-bit (i.e., $63^{rd}$ bit to $32^{nd}$ bit) round key RK2 of the 128-bit round key for encryption of the new round by performing an XOR operation of a resultant value $$(\mathbf{RK0} \oplus \mathbf{PK1}),$$

which is obtained by the third XOR gate's XOR operation of the most significant 32-bit (i.e., $127^{th}$ bit to $96^{th}$ bit) round key RK0 of the 128-bit round key of the new round with the 32-bit (i.e., $95^{th}$ bit to $64^{th}$ bit) round key PK1 next to the most significant 32-bit round key of the 128-bit round key of the previous round, with the 32-bit (i.e., $63^{rd}$ bit to $32^{nd}$ bit) round key PK2 of the previous round.

Simultaneously, the fifth XOR gate 118*c* generates a 32-bit (i.e., $31^{st}$ bit to $0^{th}$ bit) round key RK3 of the 128-bit round key for encryption of the new round by performing an XOR operation of a resultant value $$(\mathbf{RK0} \oplus \mathbf{PK1}),$$

which is obtained by the fourth XOR gate's XOR operation of the most significant 32-bit (i.e., $127^{th}$ bit to $96^{th}$ bit) round key RK0 of the 128-bit round key of the new round that has been XORed by the third XOR gate 118*a* with the 32-bit (i.e., $95^{th}$ bit to $64^{th}$ bit) round key PK1 next to the most significant 32-bit round key of the 128-bit round key of the previous round, with the 32-bit (i.e., $63^{rd}$ bit to $32^{nd}$ bit) round key PK2 of the previous round to produce a resultant value $$(\mathbf{RK0} \oplus \mathrm{PK1} \oplus \mathbf{PK2})$$

of XOR operation, and then performing an XOR operation of the resultant value $$(\mathbf{RK0} \oplus \mathrm{PK1} \oplus \mathbf{PK2})$$

with the 32-bit ($31^{st}$ bit to $0^{th}$ bit) round key PK3 of the previous round.

In the case that the 2-clock round operation start signal is inputted from the round operation control unit 300 to the round operation unit 100, the round key generation unit 110 generates the encryption round key during the one-clock period.

At this time, the process of generating the most significant 32-bit (i.e., 127 bit to $96^{th}$ bit) round key RK0 of the 128-bit round key of the new round through the second XOR gate 118 is performed when the round operation start signal is inputted and the clock is simultaneously in a '0' state.

If the first clock of the round operation start signal becomes '1', the third XOR gate 118*a* generates the 32-bit (i.e., $95^{th}$ bit to $64^{th}$ bit) round key RK1 of the 128-bit round key for encryption of the new round by performing an XOR operation of the most significant 32-bit (i.e., $127^{th}$ bit to $96^{th}$ bit) round key RK0 of the 128-bit round key of the new round with the 32-bit round key PK1 next to the most significant 32 bits of the 128-bit round key of the previous round.

Simultaneously, the fourth XOR gate 118*b* generates a 32-bit (i.e., 63 rd bit to $32^{nd}$ bit) round key RK2 of the 128-bit round key for encryption of the new round by performing an XOR operation of a resultant value (RK0 ⊕ PK1), which is obtained by the third XOR gate's XOR operation of the most significant 32-bit (i.e., 127 bit to $96^{th}$ bit) round key RK0 of the 128-bit round key of the new round with the 32-bit (i.e., $95^{th}$ bit to 64 bit) round key PK1 next to the most significant 32-bit round key of the 128-bit round key of the previous round, with the 32-bit (i.e., $63^{rd}$ bit to $32^{nd}$ bit) round key PK2 of the previous round.

Simultaneously, the fifth XOR gate 118*c* generates a 32-bit (i.e., 31 bit to 0 bit) round key RK3 of the 128-bit round key for encryption of the new round by performing an XOR operation of a resultant value (RK0 ⊕ PK1), which is obtained by the fourth XOR gate's XOR operation of the most significant 32-bit (i.e., $127^{th}$ bit to $96^{th}$ bit) round key RK0 of the 128-bit round key of the new round that has been XORed by the third XOR gate 118*a* with the 32-bit (i.e., $95^{th}$ bit to $64^{th}$ bit) round key PK1 next to the most significant 32-bit round key of the 128-bit round key of the previous round, with the 32-bit (i.e., $63^{rd}$ bit to $32^{nd}$ bit) round key PK2 of the previous round to produce a resultant value (RK0 ⊕ PK1 ⊕ PK2)

of XOR operation, and then performing an XOR operation of the resultant value (RK0 ⊕ PK1 ⊕ PK2)

with the 32-bit (31 bit to $0^{th}$ bit) round key PK3 of the previous round.

In the case that the 2-clock round operation start signal is inputted from the round operation control unit 300 to the round operation unit 100, the round key generation unit 110 generates the decryption round key during the one-clock period.

At this time, the process of generating the most significant 32-bit (i.e., $127^{th}$ bit to $96^{th}$ bit) round key RK0 of the 128-bit round key of the new round through the second XOR gate 118 is performed when the round operation start signal is inputted and the clock is simultaneously in a '0' state.

If the first clock of the round operation start signal becomes '1', the third XOR gate 118*a* generates the next 32-bit round key RK1 of the new round by performing an XOR operation of the most significant 32 bits PK0 of the previous round with the next upper 32 bits PK1 of the previous round, and in succession the fourth XOR gate 118*b* and the fifth XOR gate 118*c*, which operate in the same manner as the third XOR gate 118*a*, generate the next 32-bit round key RK2 for decryption and the least significant 32-bit round key RK3. These processes are simultaneously performed during the first clock period.

Now, the operation of the rijndael block cipher apparatus that performs the encryption and decryption process as described above will be explained in more detail in accordance with the number of clocks of the round operation start signal inputted from the round operation control unit 300 to the round operation unit 100.

Figure 4:
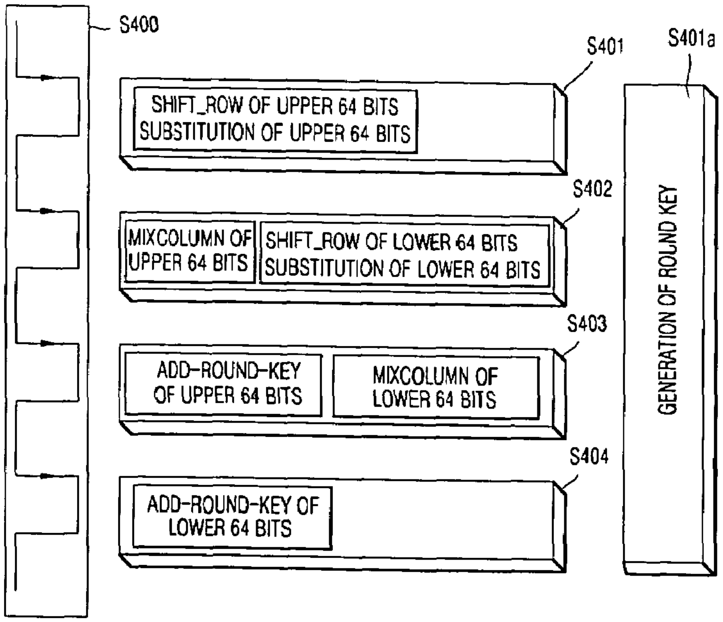
FIG. 4 is a first timing diagram illustrating a method of encrypting a rijndael block cipher according to the present invention.

FIG. 4 is a first timing diagram illustrating a method of encrypting a rijndael block cipher according to the present invention.

Referring to FIG. 4, if the four-clock round operation start signal and the round number signal are inputted from the round operation control unit 300 to the round operation unit 100 (step S400), the byte-shift transform and the substitution operation are successively performed with respect to the upper 64-bit data of the 128-bit round operation input data at the moment when the first clock becomes '1' (step S401), and these two processes are performed within one clock. The results of these processes are stored in the 64-bit data register 400. Also, at the moment when the first clock of the round operation start signal becomes '1', the 128-bit round key generation process using the 128-bit round input key starts (step S401*a*).

At the moment when the second clock of the round operation start signal becomes '1', the mixcolumn transform using the 64-bit data stored in the 64-bit data register 400 is performed with its resultant values stored in the 64-bit data register 400 (step S402), and simultaneously, the byte-shift transform and the substitution operation of the lower 64-bit data of the round operation input data are successively performed (step S402). These two processes are formed in one clock. Also, the resultant data of the byte-shift transform and the substitution operation of the lower 64-bit data are stored in a lower 64-bit position of the 128-bit data register 500 that stores the round operation results.

At the moment when the third clock of the round operation start signal becomes '1', the 64 bits stored in the 64-bit data register 400 are inputted to the add-round-key transform unit 170 so as to be added to the upper 64 bits of the round key generated by the round key generation unit 110, and the resultant value is stored in the upper 64-bit position of the 128-bit data register 500 (step S403). Also, the mixcolumn transform of the lower 64-bit data of the 128-bit data register 500 is performed, and the resultant value is stored in the lower 64-bit position of the 128-biat data register 500 (step S403).

At the moment when the fourth clock of the round operation start signal becomes '1', the lower 64 bits of the 128-bit data register 500 are inputted to the add-round-key transform unit 170 so as to be added to the lower 64 bits of the round key generated by the round key generation unit 110, and the resultant value is stored in the lower 64-bit position of the 128-bit data register 500 (step S404).

Accordingly, in the rijndael block cipher apparatus that performs the above-described encryption process, the 128-bit data of the 128-bit data register 500 is used as the 128-bit round operation input data of the next round, and the round key RK newly generated by the round key generation unit 110 and then stored in the 128-bit round key register 111*a* is also stored in the 128-bit prekey register 111 to be used as the 128-bit round input key of the next round. Consequently, the encryption operation of one round is completed within a period of four clocks.

In the case that the encryption method as illustrated in FIG. 4 is performed by the rijndael block cipher apparatus according to the present invention, the round key generation unit 110 completes the round key generation process within a period of four clocks of the round operation start signal. That is, as shown in FIG. 4, the add-round-key transform process (step S403), which is the process of adding the upper 64-bit data to the round key, is performed after the third clock from the start of the round operation. After the second clock from the start of the round operation, only the upper 64-bit round key of the new round is generated, and at this time point, there is no problem in performing the encryption operation of the round operation since only the upper 64-bit round key is used. Also, since the time point when the fourth clock starts after third clock for the round operation coincides with the time point when all the 128-bit round keys are generated, there is no problem in performing the add-round-key transform process (step S404) for adding the lower 64-bit data to the lower 64-bit round key.

Also, in the in the rijndael block cipher apparatus that performs the above-described encryption process, the 64-bit data register 400 is used as the storage space of the intermediate data generated during the encryption process, and thus the result of the byte-shift transform of the upper 64-bit data does not affect the byte-shift transform of the lower 64-bit data. Also, since the upper 64-bit data and the lower 64-bit data are simultaneously transformed, but are not transformed in the same manner during the same clock period, the number of hardware modules required for the transform can be reduced by half. Especially, the data generated for each clock is updated and stored in one storage space, and thus no additional storage space is required. That is, this case is directed to the structure that applies a pipeline structure but requires no additional hardware, and this structure will be applied in the same manner to methods of encrypting and decrypting the rijndael block cipher according to other embodiment of the present invention to be explained later.

Figure 5:
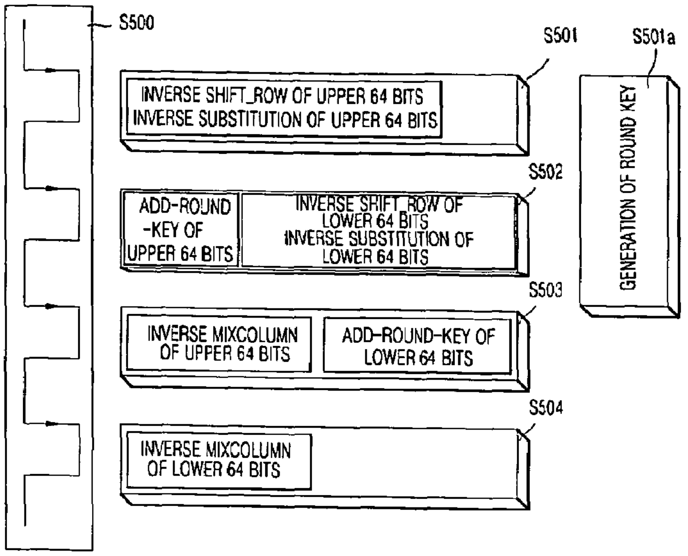
FIG. 5 is a first timing diagram illustrating a method of decrypting a rijndael block cipher according to the present invention.

FIG. 5 is a first timing diagram illustrating a method of decrypting a rijndael block cipher according to the present invention.

Referring to FIG. 5, if the four-clock round operation start signal and the round number signal are inputted from the round operation control unit 300 to the round operation unit 100 (step S500), the byte-inverse-shift transform and the inverse-substitution operation are successively performed with respect to the upper 64-bit data of the 128-bit round operation input data at the moment when the first clock becomes ‘1’ (step S501), and these two processes are performed within one clock. At this time, the resultant data is stored in the 64-bit data register 400. Also, if the first clock of the round operation start signal becomes ‘1’, the 128-bit round key generation process using the 128-bit round input key starts (step S501*a*).

At the moment when the second clock of the round operation start signal becomes ‘1’, the add-round-key transform for adding the 64-bit data stored in the 64-bit data register 400 to the upper 64 bits of the round key generated through the round key generation unit 110 is performed, and the resultant data is stored in the 64-bit data register 400 (step S502). Simultaneously, the byte-inverse-shift transform and the inverse-substitution of the lower 64-bit data of the round operation input data are successively performed, and the resultant data is stored in the lower 64-bit position of the 128-bit data register (step S502).

At the moment when the third clock of the round operation start signal becomes ‘1’, the 64-bit data stored in the 64-bit data register 400 is inputted to the mix/inverse-mixcolumn transform unit 150, and the resultant data of the inverse-mixcolumn transform is stored in the upper 64-bit position of the 128-bit data register 500 (step S503). Simultaneously, the add-round-key transform for adding the lower 64-bit data that has passed through the inverse-substitution operation to the round key generated from the round key generation unit 110 is performed, and the resultant data is stored in the lower 64-bit position of the 128-biat data register (step S503).

At the moment when the fourth clock of the round operation start signal becomes ‘1’, the lower 64-bit data that has passed through the add-round-key transform is inputted to the mix/inverse-mixcolumn transform unit 150 to be inverse-mixcolumn-transformed, and the resultant data is stored in the lower 64-bit position of the 128-bit data register 500 (step S504).

At this time, the 128-bit data of the 128-bit data register 500 is used as the 128-bit round operation input data of the next decryption round operation, and the 128-bit round key RK that is the result of the round key generation is stored in the 128-bit prekey register 111 so as to be used as the 128-bit round input key of the next round operation. Consequently, the decryption operation of one round is completed within a period of four clocks.

In the case that the decryption method as illustrated in FIG. 5 is performed by the rijndael block cipher apparatus according to the present invention, the round key generation unit 110 completes the round key generation process within a period of two clocks of the round operation start signal. That is, as shown in FIG. 5, since the add-round-key transform process (step S502), which is the process of adding the upper 64-bit round key to the 64-bit data, is performed after the second clock from the start of the round operation, all the 128-bit round keys have already been generated at the time point of the second clock, and thus there is no problem in performing the round operation.

Figure 6:
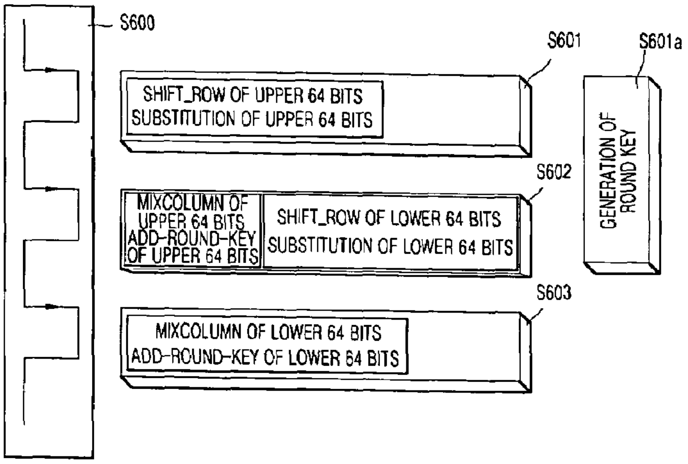
FIG. 6 is a second timing diagram illustrating a method of encrypting a rijndael block cipher according to the present invention.

FIG. 6 is a second timing diagram illustrating a method of encrypting a rijndael block cipher according to the present invention.

Referring to FIG. 6, if the three-clock round operation start signal and the round number signal are inputted from the round operation control unit 300 to the round operation unit 100 (step S600), the byte-shift operation and the substitution operation of the upper 64-bit data are successively performed at the moment when the first clock becomes ‘1’, and the resultant data is stored in the 64-bit data register (step S601). Also, the round key generation process is simultaneously performed (step S601*a*).

At the moment when the second clock of the round operation start signal becomes ‘1’, the 64-bit data stored in the 64-bit data register 400 is mixcolumn-transformed, and then added to the upper 64-bkt round key of the resultant data of the add-round-key transform unit 110. The resultant data of the add-round-key transform is stored in the 64-bit data register 400 (step S602). Simultaneously, the byte-shift transform and the substitution operation of the lower 64-bit data are successively performed, and the resultant data is stored in the lower 64-bit position of the 128-bit data register 500 (step S602).

At the moment when the third clock of the round operation start signal becomes ‘1’, the 64-bit data stored in the 64-bit data register 400 is inputted to the upper 64-bit position of the 128-bit data register 500, and the lower 64-bit data of the 128-bit data register 500 is mixcolumn-transformed and then added to lower 64-bit round key of the round key generated by the round key generation unit 110. The resultant data is stored in the lower 64-bit position of the 128-bit data register 500 (step S603).

At this time, the 128-bit data of the 128-bit data register 500 is used as the 128-bit round operation input data of the next round operation, and the round key RK generated by the round key generation unit 110 is stored in the 128-bit prekey register 111 and then used as the 128-bit round input key of the next round. Consequently, the encryption operation of one round is completed within a period of three clocks.

In the case that the encryption method as illustrated in FIG. 6 is performed by the rijndael block cipher apparatus according to the present invention, the round key generation unit 110 completes the round key generation process within a period of two clocks of the round operation start signal. That is, as shown in FIG. 6, since the add-round-key transform process (step S602), which is the process of adding the upper 64-bit round key to the upper 64-bit data, is performed after the second clock from the start of the round operation, all the 128-bit round keys have already been generated at the time point of the second clock, and thus there is no problem in performing the round operation.

Figure 7:
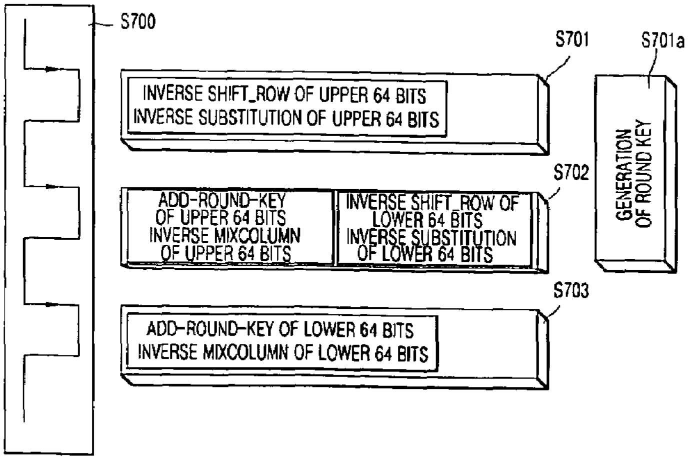
FIG. 7 is a second timing diagram illustrating a method of decrypting a rijndael block cipher according to the present invention.

FIG. 7 is a second timing diagram illustrating a method of decrypting a rijndael block cipher according to the present invention.

Referring to FIG. 7, if the three-clock round operation start signal and the round number signal are inputted from the round operation control unit 300 to the round operation unit 100 (step S700), the byte-inverse-shift transform and the inverse-substitution operation are successively performed with respect to the upper 64-bit data of the 128-bit round operation input data at the moment when the first clock becomes '1', and the resultant data is stored in the 64-bit data register 400 (step S701). Also, the round key generation process starts simultaneously with these transforms (step S701*a*).

When the second clock of the round operation start signal becomes '1', the add-round-key transform for adding the 64-bit data stored in the 64-bit data register 400 to the upper 64-bit round key of the round key generated by the round key generation unit 110 is performed, and the resultant data is inputted to the mix/inverse-mixcolumn transform unit 150. The inverse-mixcolumn-transformed data is stored in the 64-bit data register 400 (step S702). Simultaneously, the byte-inverse-shift transform and the inverse-substitution transform of the lower 64-bit data of the round operation input data are successively performed, and the resultant data is stored in the lower 64-bit position of the 128-bit data register (step S702).

At the moment when the third clock of the round operation start signal becomes '1', the 64-bit data stored in the 64-bit data register 400 is stored in the upper 64-bit position of the 128-bit data register 500, and the add-round-key transform for adding the lower 64-bit data of the 128-bit data register 500 to the lower 64-bit round key of the round key generation unit 110 is performed. The resultant data of the add-round-key transform is then inverse-mixcolumn-transformed, and the resultant data of the inverse-mixcolumn transform is stored in the lower 64-bit position of the 128-bit data register 500 (step S703).

At this time, the 128-bit data of the 128-bit data register 500 is used as the 128-bit round operation input data of the next round operation, and the 128-bit round key RK generated by the round key generation unit 110 is stored in the 128-bit prekey register 111 so as to be used as the 128-bit round input key of the next round operation. Consequently, the decryption operation of one round is completed within a period of three clocks.

In the case that the decryption method as illustrated in FIG. 7 is performed by the rijndael block cipher apparatus according to the present invention, the round key generation unit 110 completes the round key generation process within a period of two clocks of the round operation start signal. That is, as shown in FIG. 7, since the add-round-key transform process (step S702) for adding the upper 64-bit round key to the upper 64-bit data is performed after the second clock from the start of the round operation, all the 128-bit round keys have already been generated at the time point of the second clock, and thus there is no problem in performing the round operation.

Figure 8:
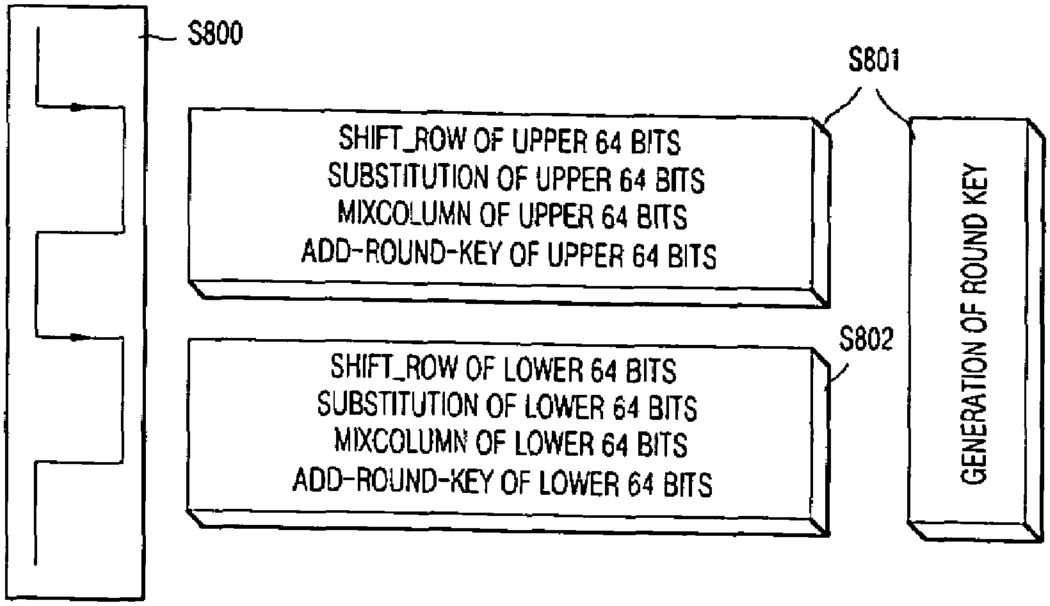
FIG. 8 is a third timing diagram illustrating a method of encrypting a rijndael block cipher according to the present invention.

FIG. 8 is a third timing diagram illustrating a method of encrypting a rijndael block cipher according to the present invention.

Referring to FIG. 8, if the two-clock round operation start signal and the round number signal are inputted from the round operation control unit 300 to the round operation unit 100 (step S800), the byte-shift transform, the substitution transform, the mixcolumn transform and the add-round-key transform are successively performed with respect to the upper 64-bit data of the round input data when the first clock becomes '1', and the resultant data is stored in the 64-bit data register 400 (step S801). Simultaneously, the round key generation process (step S801*a*) is performed, and the add-round-key transform of the upper 64-bit round key of the generated round key is performed. These processes are performed in a period of one clock.

When the second clock of the round operation start signal becomes '1', the byte-shift transform, the substitution transform, the mixcolumn transform and the add-round-key transform are successively performed with respect to the lower 64-bit data of the round input data, and the resultant data is stored in the lower 64-bit position of the 128-bit data register 500 (step S802). Also, the add-round-key transform of the lower 64-bit round key of the round key generated in the round key generation process is performed. At this time, the 64-bit data stored in the 64-bit data register 400 is stored in the upper 64-bit position of the 128-bit data register 500, and the 128-bit round key RK newly generated by the round key generation unit 110 is stored in the 128-bit round key register 111*a* and backed up in the 128-bit prekey register 111. Consequently, the encryption operation of one round is completed within a period of two clocks.

In the case that the encryption method as illustrated in FIG. 8 is performed by the rijndael block cipher apparatus according to the present invention, the round key generation unit 110 completes the round key generation process within a period of one clock of the round operation start signal. That is, as shown in FIG. 8, since the add-round-key transform process (step S801) for adding the upper 64-bit round key to the upper 64-bit data is performed after the first clock from the start of the round operation, all the 128-bit round keys have already been generated at the time point of the first clock, and thus there is no problem in performing the round operation.

Actually, the round key generation unit 110 as illustrated in FIG. 3 generates RK1 using RK0, and RK2 using RK1. The round key generation unit 110 does not generate RK3 using RK2, but generates RK0 in a state that the round operation start signal is inputted and the clock becomes '0' simultaneously. When the first clock becomes '1', the round key generation unit 110 generates RK1 by XORing RK0 with PK1, RK2 by XORing RK0 with PK1 and PK2, and RK3 by XORing RK0 with PK1, PK2 and PK3, simultaneously.

Figure 9:
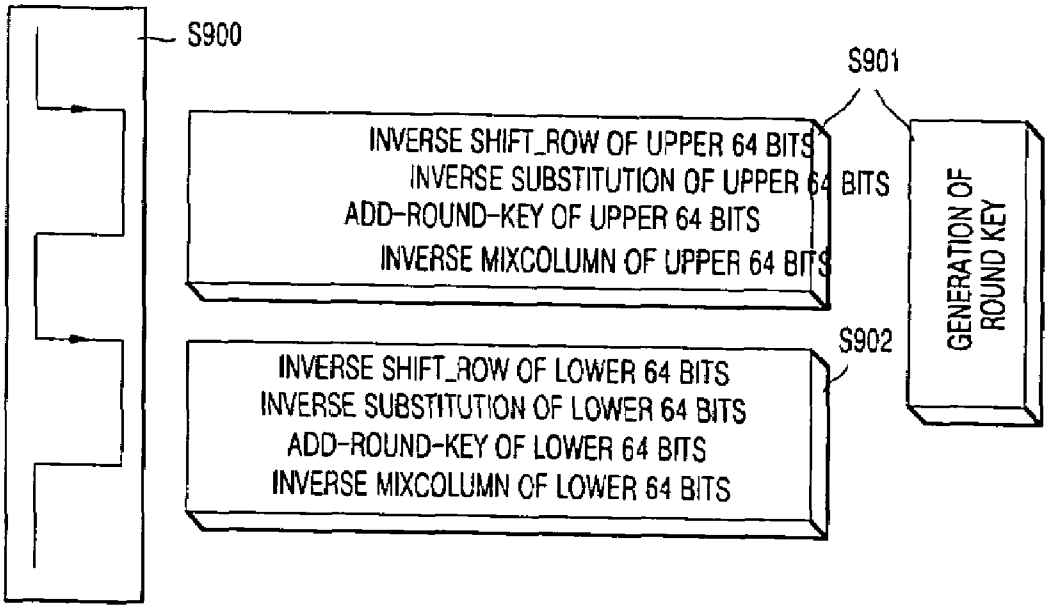
FIG. 9 is a third timing diagram illustrating a method of decrypting a rijndael block cipher according to the present invention.

FIG. 9 is a third timing diagram illustrating a method of decrypting a rijndael block cipher according to the present invention.

Referring to FIG. 9, if the two-clock round operation start signal and the round number signal are inputted from the round operation control unit 300 to the round operation unit 100 (step S900), the byte-inverse-shift transform, the inverse-substitution transform, the add-round-key transform and the inverse-mixcolumn transform are successively performed with respect to the upper 64-bit data of the round input data when the first clock becomes '1', and the resultant data is stored in the 64-bit data register 400 (step S901). These processes are performed in a period of one clock. Simultaneously, the round key generation process (step S901*a*) for decryption is performed, and the add-round-key transform of the upper 64-bit round key of the round key generated by the round key generation unit 110 is performed.

When the second clock of the round operation start signal becomes '1', the byte-inverse-shift transform, the inverse-substitution transform, the add-round-key transform and the inverse-mixcolumn transform are successively performed with respect to the lower 64-bit data of the round input data, and the resultant data is stored in the lower 64-bit position of the 128-bit data register 500 (step S902). These processes are performed in a period of one clock. Also, the lower 64-bit round key of the round key generated prior to one clock by the round key generation unit 110 is used for the add-round-key transform. At this time, the 64-bit data stored in the 64-bit data register 400 is stored in the upper 64-bit position of the 128-bit data register 500, and the 128-bit round key RK newly generated by the round key generation unit 110 is stored in the 128-bit round key register 111*a* and backed up in the 128-bit prekey register 111. Consequently, the decryption operation of one round is completed within a period of two clocks.

In the case that the decryption method as illustrated in FIG. 9 is performed by the rijndael block cipher apparatus according to the present invention, the round key generation unit 110 completes the round key generation process within a period of one clock of the round operation start signal. That is, as shown in FIG. 9, the add-round-key transform process (step S901) for adding the upper 64-bit round key to the upper 64-bit data is performed after the first clock from the start of the round operation, but all the 128-bit round keys have already been generated at the time point of the first clock, and thus there is no problem in performing the round operation.

Actually, the round key generation unit 110 as illustrated in FIG. 3 generates RK0 in a state that the round operation start signal is inputted and the clock becomes '0' simultaneously. When the first clock becomes '1', the round key generation unit 110 generates RK1 by XORing RK0 with PK1, RK2 by XORing PK1 with PK2, and RK3 by XORing PK2 with PK3, simultaneously.

As described above, the rijndael block cipher apparatus according to the encryption method as illustrated in FIG. 8 and the decryption method as illustrated in FIG. 9 is a model suitable to be applied to a smart card, a USIM (User Subscriber Identity Module) card, a SIM card, etc., that have a small size, a low power consumption, and a low operational frequency characteristic.

INDUSTRIAL APPLICABILITY

As apparent from the above description, the rijndael block cipher apparatus and the encryption/decryption method thereof according to the present invention can encrypt and decrypt important data that requires security at high speed by being mounted in a mobile terminal such as a cellular phone and a PDA or a smart card, which requires a high-rate and small-sized cipher processor, and can perform a round operation with respect to upper 64 bits and lower 64 bits which are divided from 128-bit input data. The present invention has the following effects:

First, the cipher apparatus according to the present invention has a small size and can encrypt/decrypt real-time data at high speed by repeatedly using the round operation device in the apparatus.

Second, since the cipher apparatus according to the present invention encrypts/decrypts block cipher data in real time using the round operation device applying a rijndael algorithm, it can provide a higher-graded security in comparison to an operation device applying the existing DES (Data Encryption Standard).

Third, the rijndael encryption/decryption round operation device of the cipher apparatus according to the present invention has the advantage that it can encrypt/decrypt block cipher data in real time by adding a simple controller that repeats the round operation for a predetermined number of times.

Fourth, the round operation device of the cipher apparatus according to the present invention can rapidly encrypt/decrypt data in real time although it has a small size that is almost half the size of the existing round operation device in the unit of 128 bits.

Fifth, the round operation device of the cipher apparatus according to the present invention can be implemented using a proper method according to its application fields, and in the case of applying to a system that is irrespective of the amount of hardware resource used, it can obtain a two-times high speed of data encryption/decryption by applying a round process in the unit of 128 bits instead of a round process in the unit of 64 bits.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

The invention claimed is:

1. A rijndael block encryption apparatus having M-bit input data and N-bit input keys and encrypting the M-bit input data by repeating for a predetermined number of times a round operation that includes transforms of shift_row, substitution, mixcolumn and add-round-key, the apparatus comprising:

a round operation unit including a round operation execution unit for processing the data in the unit of M/m bits (where m is 2, 3 or 4) at least in the transforms of substitution, mixcolumn and add-round-key, and a round key generation unit for generating round keys in order to provide the round keys in the transform of the add-round-key;

a round operation control unit for controlling the round operation performed by the round operation unit; and a data storage unit for storing M/m-bit intermediate data generated by the round operation unit at an intermediate stage of every round and M-bit data generated at an end stage of every round, wherein the round keys generated in the round key generation unit is added to an upper M/m input data in the round operation execution unit while simultaneously begin processing of a lower M/m input data in the round operation execution unit before the end stage of every round for the upper M/m input data in the round operation execution unit at a same clock cycle without the upper M/m input data and the lower M/m input being processed in any one of a same transform of the transforms comprising of at least the substitution, mixcolumn and add-round-key, wherein the end stage of every round indicates that the data in the unit of M/m bits (where m is 2, 3 or 4) have been processed in all of the at least transforms of the substitution, mixcolumn and add-round-key, and wherein the processing of the upper M/m input data and the lower M/m input data are transformed in a same manner of a same circuit for each of the at least transforms of the substitution, mixcolumn and add-round-key.

2. The apparatus as claimed in claim 1, wherein the data storage unit includes at least one register, and a total summed size of the register is equal to or larger than M(2m−1)/m bits.

3. A rijndael block decryption apparatus having M-bit input data and N-bit input keys and decrypting the M-bit input data by repeating for a predetermined number of times a round operation that includes transforms of inverse shift_row, inverse substitution, add-round-key and inverse mixcolumn, the apparatus comprising:

a round operation unit including a round operation execution unit for processing the data in the unit of M/m bits (where m is 2, 3 or 4) at least in the transforms of inverse substitution, add-round-key and inverse mixcolumn, and a round key generation unit for generating round keys in order to provide the round keys in the transform of add-round-key;

a round operation control unit for controlling the round operation performed by the round operation unit; and a data storage unit for storing M/m-bit intermediate data generated by the round operation unit at an intermediate stage of every round and M-bit data generated at an end stage of every round, wherein the round keys generated in the round key generation unit is added to an upper M/m input data in the round operation execution unit while simultaneously begin processing of a lower M/m input data in the round operation execution unit before the end stage of every round for the upper M/m input data in the round operation execution unit at a same clock cycle without the upper M/m input data and the lower M/m input being processed in any one of a same transform of the transforms comprising of at least the substitution, mixcolumn and add-round-key, wherein the end stage of every round indicates that the data in the unit of M/m bits (where m is 2, 3 or 4) have been processed in all of the at least transforms of the substitution, mixcolumn and add-round-key, and wherein the processing of the upper M/m input data and the lower M/m input data are transformed in a same manner of a same circuit for each of the at least transforms of the substitution, mixcolumn and add-round-key.

4. The apparatus as claimed in claim 3, wherein the data storage unit includes at least one register, and a total summed size of the register is equal to or larger than M (2m−1)/m bits.

5. A rijndael block cipher apparatus having M-bit input data and N-bit input keys, and encrypting the M-bit input data by repeating for a predetermined number of times a round operation for encryption that includes transforms of shift_row, substitution, mixcolumn and add-round-key or decrypting the M-bit input data by repeating for a predetermined number of times a round operation for decryption that includes transforms of inverse shift_row inverse substitution, add-round-key and inverse mixcolumn, the apparatus comprising:

a round operation unit including a round operation execution unit for processing the data in the unit of M/m bits (where m is 2, 3 or 4) at least in the transforms of substitution, mixcolumn and add-round-key in an encryption mode and for processing the data in the unit of M/m bits (where m is 2, 3 or 4) at lease in the transforms of inverse substitution, add-round-key and inverse mixcolumn in a decryption mode, and a round key generation unit for generating round keys in order to provide the round keys in the transform of add-round-key;

a round operation control unit for controlling the round operation performed by the round operation unit; and a data storage unit for storing M/m-bit intermediate data generated by the round operation unit at an intermediate stage of every round and M-bit data generated at an end stage of every round, wherein the round keys generated in the round key generation unit is added to an upper M/m input data in the round operation execution unit while simultaneously begin processing of a lower M/m input data in the round operation execution unit before the end stage of every round for the upper M/m input data in the round operation execution unit at a same clock cycle without the upper M/m input data and the lower M/m input being processed in any one of a same transform of the transforms comprising of at least the substitution, mixcolumn and add-round-key, wherein the end stage of every round indicates that the data in the unit of M/m bits (where m is 2, 3 or 4) have been processed in all of the at least transforms of the substitution, mixcolumn and add-round-key, and wherein the processing of the upper M/m input data and the lower M/m input data are transformed in a same manner of a same circuit for each of the at least transforms of the substitution, mixcolumn and add-round-key.

6. The apparatus as claimed in claim 5, wherein the round operation execution unit comprises:

a shift/inverse-shift_row operation means for performing the shift_row operation and the inverse shift_row operation of the data;

a substitution/inverse-substitution operation means for performing the substitution operation and the inverse substitution operation of the data;

a mixcolumn/inverse-mixcolumn operation means for performing the mixcolumn operation and the inverse mixcolumn operation of the data; and an add-round-key operation means for performing the add-round-key operation of the data.

7. The apparatus as claimed in claim 6, wherein the round operation execution unit further comprises a plurality of demultiplexing means for controlling a flow of the data among the substitution/inverse-substitution operation means, the mixcolumn/inverse-mixcolumn operation means and the add-round-key operation means so as to perform the round operation for the encryption or the round operation for the decryption according to an input of a mode signal that indicates the encryption or decryption mode.

8. The apparatus as claimed in any one of claims 5 to 7, wherein the data storage unit includes at least one register, and a total summed size of the register is equal to or larger than M(2m−1)/m bits.

9. A rijndael block encryption method for receiving M-bit input data and N-bit input keys and performing a round operation of the input data for a predetermined number of times, the method comprising:

a round operation step of performing a round operation with respect to all m data of M/n bits, the round operation including sub-steps of a shift_row transform for performing a shift_row of the M-bit data from a previous round and outputting only M/m-bit (where m is 2, 3 and 4) data corresponding to a selection signal to a next step, a substitution transform for performing a substitution of the M/m-bit data, a mixcolumn transform for performing a mixcolumn of the M/m-bit data, and an add-round-key transform for performing an addition of round keys having the same size to the M/m-bit data, respectively; and a round key generation step of generating the round keys in order to provide the round keys at the sub-step of the add-round-key transform, wherein the round keys generated in the round key generation unit is added to an upper M/m input data in the round operation execution unit while simultaneously begin processing of a lower M/m input data in the round operation execution unit before the end stage of every round for the upper M/m input data in the round operation execution unit at a same clock cycle without the upper M/m input data and the lower M/m input being processed in any one of a same transform of the transforms comprising of at least the substitution, mixcolumn and add-round-key, wherein the end stage of every round indicates that the data in the unit of M/m bits (where m is 2, 3 or 4) have been processed in all of the at least transforms of the substitution, mixcolumn and add-round-key, and wherein the processing of the upper M/m input data and the lower M/m input data are transformed in a same manner of a same circuit for each of the at least transforms of the substitution, mixcolumn and add-round-key.

10. The method as claimed in claim 9, wherein the data having the size of M/m bits can be processed through the steps of the shift_row transform, the substitution transform, the mixcolumn transform and the add-round-key transform, respectively, and a plurality of the M/m-bit data can be processed through the plural steps selected among the four steps at the same time according to a predetermined timing.

11. A rijndael block decryption method for receiving M-bit input data and N-bit input keys and performing a round operation of the input data for a predetermined number of times, the method comprising:

a round operation step of performing a round operation with respect to all m data of M/n bits, the round operation including sub-steps of an inverse shift_row transform for performing an inverse shift_row of the M-bit data from a previous round and outputting only M/m-bit (where m is 2, 3 and 4) data corresponding to a selection signal to a next step, an inverse substitution transform for performing an inverse substitution of the M/m-bit inverse-shift_row-transformed data, an add-round-key transform for performing an addition of round keys having the same size to the M/m-bit inverse-substitution-transformed data, respectively, and an inverse mixcolumn transform for performing an inverse mixcolumn of the M/m-bit add-round-key-transformed data; and a round key generation step of generating the round keys in order to provide the round keys at the sub-step of the add-round-key transform, wherein the round keys generated in the round key generation unit is added to an upper M/m input data in the round operation execution unit while simultaneously begin processing of a lower M/m input data in the round operation execution unit before the end stage of every round for the upper M/m input data in the round operation execution unit at a same clock cycle without the upper M/m input data and the lower M/m input being processed in any one of a same transform of the transforms comprising of at least the substitution, mixcolumn and add-round-key, wherein the end stage of every round indicates that the data in the unit of M/m bits (where m is 2, 3 or 4) have been processed in all of the at least transforms of the substitution, mixcolumn and add-round-key, and wherein the processing of the upper M/m input data and the lower M/m input data are transformed in a same manner of a same circuit for each of the at least transforms of the substitution, mixcolumn and add-round-key.

12. The method as claimed in claim 11, wherein the data having the size of M/m bits can be processed through the steps of the inverse shift_row transform, the inverse substitution transform, the add-round-key transform and the inverse mixcolumn transform, respectively, and a plurality of the M/m-bit data can be processed through the plural steps selected among the four steps at the same time according to a predetermined timing.

* * * * *